United States Patent [19]

Stumpf

[11] Patent Number: 5,444,318

[45] Date of Patent: Aug. 22, 1995

[54] MOTOR WITH PERMANENT MAGNET ACTUATED BRAKE

[75] Inventor: William R. Stumpf, Kingsville, Md.

[73] Assignee: Black & Decker Inc., Newark, Del.

[21] Appl. No.: 200,111

[22] Filed: Feb. 22, 1994

[51] Int. Cl.[6] .................... H02K 7/10; H02K 49/00; H02K 21/26; H02K 49/10

[52] U.S. Cl. .................... 310/77; 310/103; 310/154

[58] Field of Search ............ 310/42, 154, 218, 77, 310/103

[56] References Cited

U.S. PATENT DOCUMENTS

| | | | |
|---|---|---|---|
| 2,062,938 | 12/1936 | Ruppe | 310/156 |
| 3,790,830 | 2/1974 | Bonfiglio | 310/154 |
| 4,587,449 | 5/1986 | West | 310/154 |
| 4,769,624 | 9/1988 | Merritt et al. | 310/154 |
| 4,855,630 | 8/1989 | Cole | 310/156 |
| 4,916,344 | 4/1990 | Hammer et al. | 310/154 |
| 5,087,845 | 2/1992 | Behrens et al. | 310/77 |
| 5,281,881 | 1/1994 | Gentry et al. | 310/154 |

FOREIGN PATENT DOCUMENTS

2453416 5/1976 Germany .
1549876 8/1979 United Kingdom .

*Primary Examiner*—Clayton E. LaBalle
*Attorney, Agent, or Firm*—Dennis A. Dearing; John D. Del Ponti; Charles E. Yocum

[57] ABSTRACT

A universal motor comprises an armature 13, brushes 15, 17 and stator or run windings 19, 21. To provide a permanent magnet actuated dynamic brake circuit 22, permanent magnets 23, 25 are located, respectively, in opposed stator poles 27, 29. In the run mode, power is supplied to stator windings 19, 21 from a rectified ac power supply 33, 35. In the brake mode, brake circuit 22 is actuated by short circuiting armature 13. Due to back EMF, the current flows through armature 13 in a direction opposite to that produced by the rectified ac input in the run mode to provide dynamic braking. To precisely and durably mount magnets 23, 25 in stator poles 25, 27; straps 69, 71 extend around and completely entrap magnets 23, 25 in slots 65, 67.

22 Claims, 5 Drawing Sheets

MOTOR WITH PERMANENT MAGNET ACTUATED BRAKE

BACKGROUND OF THE INVENTION

The invention relates small electric motors such as series wound or universal motors, shunt wound field motors and compound wound motors and more particularly relates to a permanent magnet actuated brake for such motors.

Power tools are typically powered by small universal motors. Many power tools are most desirably equipped with an electric dynamic brake to reliably and quickly stop the tool's operation upon release of its control switch. Existing dynamic brakes suffer from one or more of a number of problems including high cost, complexity, excessive and variable stopping time, poor reliability of actuation, degradation of motor components (brushes, commutator and switches) and bulky size. One patent that addresses these problems is U.S. Pat. No. 5,087,845-Behrens et al. The Behrens patent discloses a universal motor with a permanent magnet actuated brake circuit. In the run mode, the stator and armature windings are connected to a power supply and positive current goes through the armature winding in a first direction. In the braking mode, the windings are disconnected from the power supply and the armature winding is short circuited. In the presence of the residual magnetic field in the stator from the run mode and the magnetic field from permanent magnets located in the stator poles, regenerative direct current is produced in the short circuited armature winding opposite to the direction of the current in the run mode. The current flow is in the direction of reversing armature rotation and will, therefore, bring the armature rapidly to a stop. By use of the permanent magnet, the brake is more reliable and has a more consistent stopping time than a brake that relies solely on the residual stator field for actuation. The residual stator field varies as a function of the amplitude of the ac input signal when the brake is actuated. As the residual field decreases stopping time increases. And, when the field is weak, the brake will fail to actuate.

Experiments have been conducted with universal motors with a permanent magnet actuated brake as disclosed in the Behrens patent. Such brakes have also proven to be unreliable due to demagnetization of the permanent magnets, and lack of stability and durability of the mounting for the permanent magnets leading to rubbing or engagement between the magnets and the armature rotor. One particular problem not addressed by the Behrens patent is the identification of a durable and precise technique for attaching the permanent magnet to the stator poles. One commercial product based on the Behrens patent utilized a glue to bond the permanent magnet in slots in the stator poles. This technique has proven not to be stable and durable under operating conditions such as vibration, shock and high temperature to which power tools are typically exposed. Certain improvements for such permanent magnet actuated brakes are disclosed in copending U.S. patent application Ser. No. 08/199,472, entitled Electric Motor Having Permanent Magnet Brake, filed on Feb. 22, 1994 in the names of Du, Mason and Beckhardt and assigned to the assignee of the present application. The improvements relate to a motor circuit with a rectified power supply and an injected metal technique for mounting the permanent magnets in the stator poles. Additional and alternative improvements for such brakes are disclosed and claimed in this application.

SUMMARY OF THE INVENTION

A primary object of the present invention is to provide an improved motor with a permanent magnet actuated brake.

The present invention is particularly concerned with techniques for reliably, precisely and durably mounting a brake magnet in the stator poles.

In accordance with the present invention, a motor comprises a stator having a pair of opposed poles and first and second stator windings wound, respectively, around the first and second poles. An armature is rotatably supported in a motor housing for rotation about the longitudinal axis of the stator. The armature includes a rotor and an armature winding wound on the rotor. A switch has a first position for supplying power to the stator and armature windings for operation of the motor in the run mode and has a second position for short circuiting the armature winding in the brake mode. At least one permanent magnet is located in an axially extending slot in one stator pole. A strap extends along the slot and around the magnets to retain it in the slot. A first means retains the strap in tight engagement with the magnet.

The retaining means may be selected from a group of techniques including (a) spot welding the strap ends at axially opposed ends of the stator lamination stack, (b) fixing the strap end between an axially opposed end of the stator lamination stack and a stator end ring, (c) overlapping and spot welding the ends of the strap together on the outside wall of the stator and (d) overlapping and holding the strap ends on the outside wall of the stator in place by engagement with a motor housing rib.

Preferably, to achieve a desirably low stopping time, a second permanent magnet is located in an axially extending slot in the second stator pole.

To ensure that the straps lay flat on the magnets, each strap is preferably crowned axially of the stator and toward the magnet in the underlying slot.

Preferably each strap has a planar inner face such that transverses line lying in the plane of the strap inner face are approximately tangent to the cylinder defined by the pole inner surfaces. And, the lines define with the segmented cylindrical surface of the rotor an air gap that is approximately equal to the air gap between the pole inner surfaces and the rotor outer surface. Minimization of the air gap between the permanent magnet and rotor outer surface is important as the brake stopping time is directly proportional to the air gap thickness.

Additional objects and advantages of the invention will be apparent from the detailed description of the preferred embodiments, the appended claims and the accompanying drawings or may be learned by practice of the invention.

BRIEF DESCRIPTION OF THE DRAWINGS

The accompanying drawings which are incorporated in, and constitute a part of, this specification illustrate four embodiments of the invention and together with the description serve to explain the principles of the invention. In the drawings, the same referenced numerals indicate the same parts.

DESCRIPTION OF PREFERRED EMBODIMENTS

Figure 1:
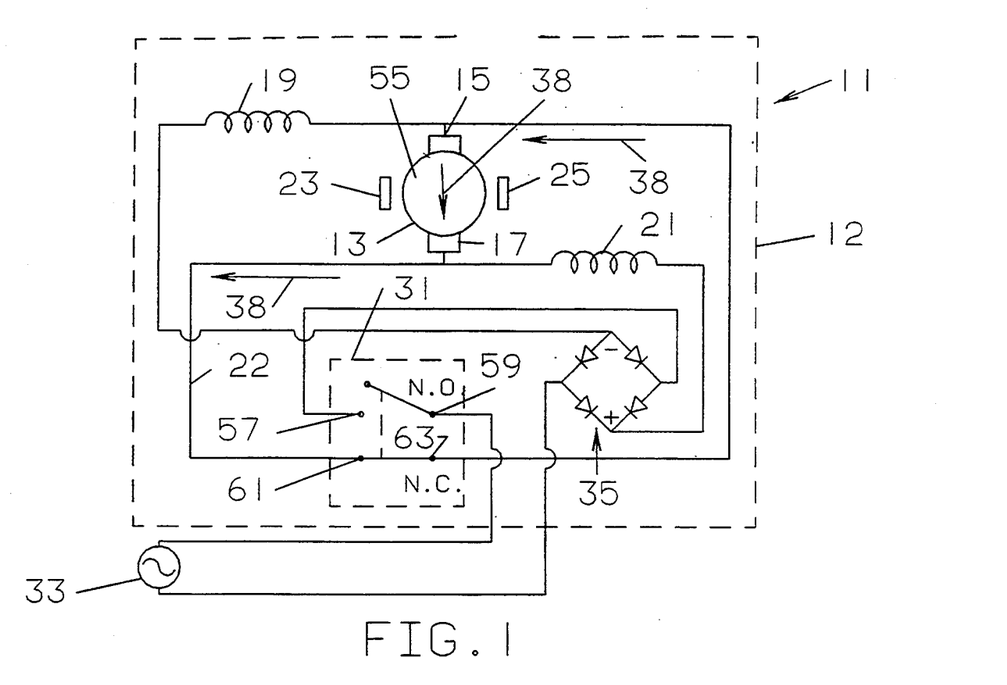
FIG. 1 is an electrical schematic of a motor in accordance with a preferred embodiment of the present invention and illustrates the motor in a brake mode.
Figure 2:
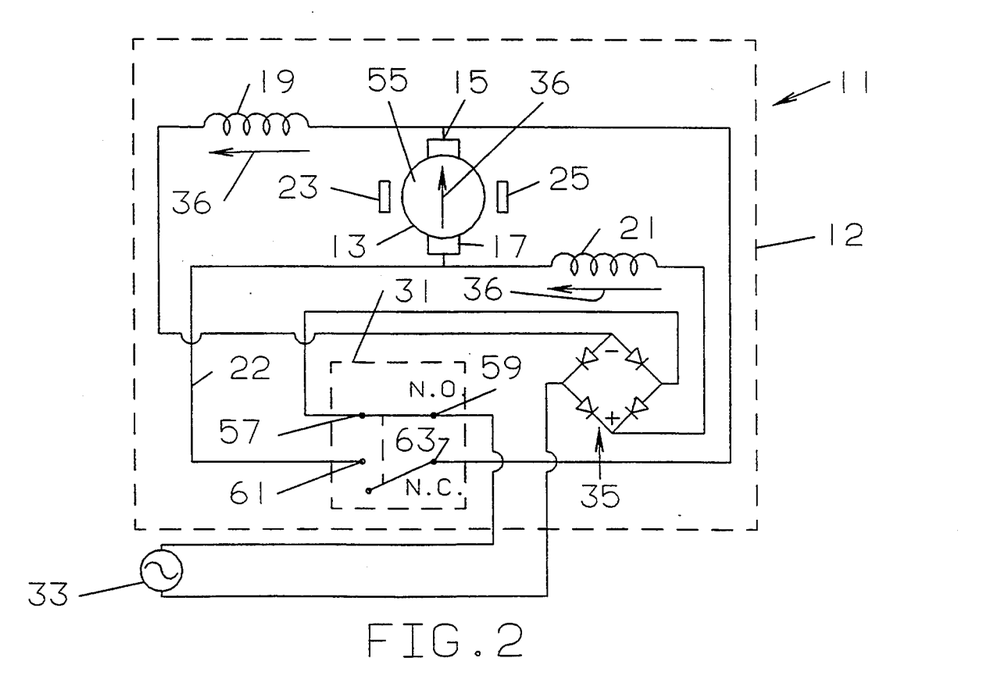
FIG. 2 is an electrical schematic of the motor of FIG. 1 illustrating the motor in the run mode.
Figure 9:
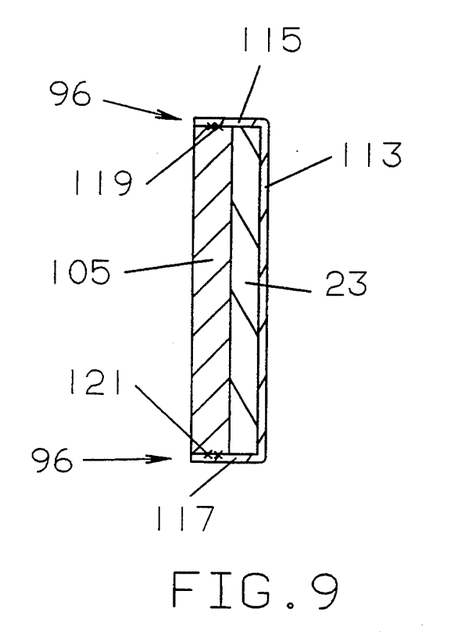
FIG. 9 is a cross-sectional view similar to FIG. 6 and illustrating a second preferred embodiment of a strap retaining means of the present invention.
Figure 10:
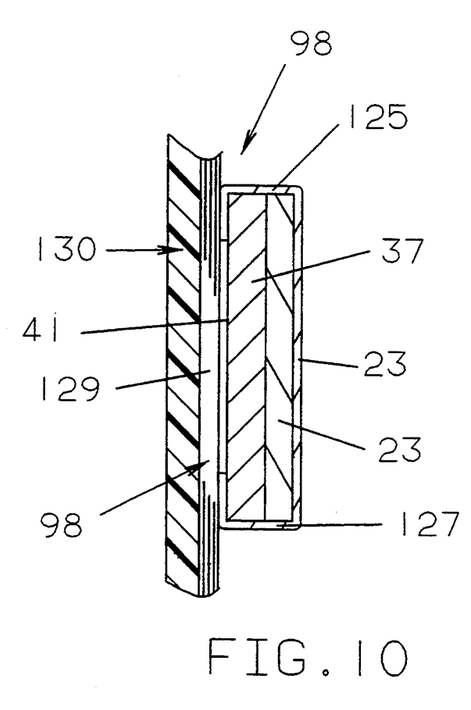
FIG. 10 is a cross-sectional view similar to FIG. 6 and illustrating a third preferred embodiment of a strap retaining means of the present invention.
Figure 11:
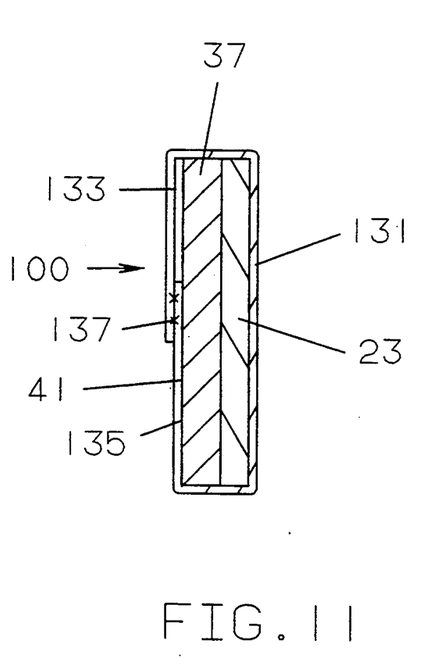
FIG. 11 is a cross-sectional view similar to FIG. 6 and illustrating a fourth preferred embodiment of a strap retaining means of the present invention.

FIGS. 1-2 are electrical schematics of a preferred embodiment of the present invention and illustrate the brake and run modes, respectively, of operation. FIGS. 3-8 illustrate the stator of a preferred embodiment of a universal motor in accordance with the present invention and illustrates in detail one preferred technique for mounting a brake magnet in the stator. FIGS. 9-11 illustrate, respectively, three alternative techniques for mounting a brake magnet in the stator of a motor in accordance with the present invention.

In brief, as shown in FIG. 1, a universal motor 11 comprises a housing 12, an armature 13, brushes 15, 17 and stator or run windings 19, 21. To provide a permanent magnet actuated dynamic brake circuit 22 (FIG. 1), permanent magnets 23, 25 are located, respectively, in opposed stator poles 27, 29 as shown in FIGS. 5-12 and described in detail below. As shown in FIG. 2, power is supplied to stator windings 19, 21 and armature 13 from an ac supply 33 through switch 31. To rectify the ac input, motor 11 further comprises a full wave diode bridge rectifier 35. In FIG. 2, the arrows 36 indicate the positive current path for the positive and negative half cycles of the ac input. As shown in FIG. 1, when switch 31 is in the normally opened position, brake circuit 22 is actuated by short circuiting of armature 13. In FIG. 1, the arrows 38 indicate the positive current path when armature 13 is short circuited. Due to back EMF, the current flows through armature 13 in a direction opposite to that produced by the rectified ac input to provide dynamic braking.

Motor housing 12 (FIGS. 1, 2) may be constituted by a separate field case or may be constituted by a housing for a power tool utilizing the motor.

In accordance with the invention, motor 11 (FIGS. 3-5) further comprises an annular stator 37 having inner and outer walls 39, 41. Opposed stator poles 27, 29 are formed, respectively, on opposed locations of inner wall 39 and extends axially of inner wall 39. Each pole 27, 29 includes a pair of circumferentially extending pole tips 45, 47; 49, 51 with cylindrical inner surfaces 52 defining a longitudinal axis of rotation 43. First and second stator windings 19, 21 are wound, respectively, around first and second poles 27, 29.

Motor armature 13 (FIG. 3A) is rotatably supported in housing 12 and extends along and is rotatable about the longitudinal axis 43 of stator 37. Armature 13 comprises a rotor 53 and an armature winding 55 wound on rotor 53.

In accordance with the invention, switch 31 has a first position shown in FIG. 2 for supplying power to the stator and armature windings 19, 21, 55 for operation of the motor and has a second position shown in FIG. 1 for short circuiting armature winding 55. Preferably, functionally switch 31 consists of two single pole single throw switches with alternate contact (one pole normally open and one pole normally closed). In a power tool such as a circular saw switch 31 will be constituted by the trigger switch for operation of the saw. Thus, to actuate the saw, switch 31 is actuated to close normally opened contacts 57, 59. Upon release, normally opened contacts 57, 59 are opened and normally closed contacts 61, 63 are closed to complete brake circuit 22 by short circuiting armature winding 55.

According to the present invention, to ensure actuation of brake circuit 22, motor 11 further comprises at least one permanent magnet 23 located in an axially extending slot 65 formed in pole 27. To provide a permanent magnetic field sufficient to achieve a desirably short stopping time of, for example, two seconds, a second permanent magnet 25 is located in an axially extending slot 67 formed in second pole 29. Preferably, permanent magnets 23, 25 are bar-shaped and are made of neodymium iron boron (NIB). Slots 65, 67 preferably have outwardly tapered sidewalls 66, 68 which terminate in an axially extending rear faces 70, 72. Sidewalls 66, 68 are outwardly tapered out of contact with magnets 23, 25 to avoid distortion of the permanent magnetic field by conduction through poles 27, 29. Faces 70, 72 are sized to match the width of magnets 23, 25 to aid in transversely locating magnets 23, 25 relative to axis 43.

Figure 3:
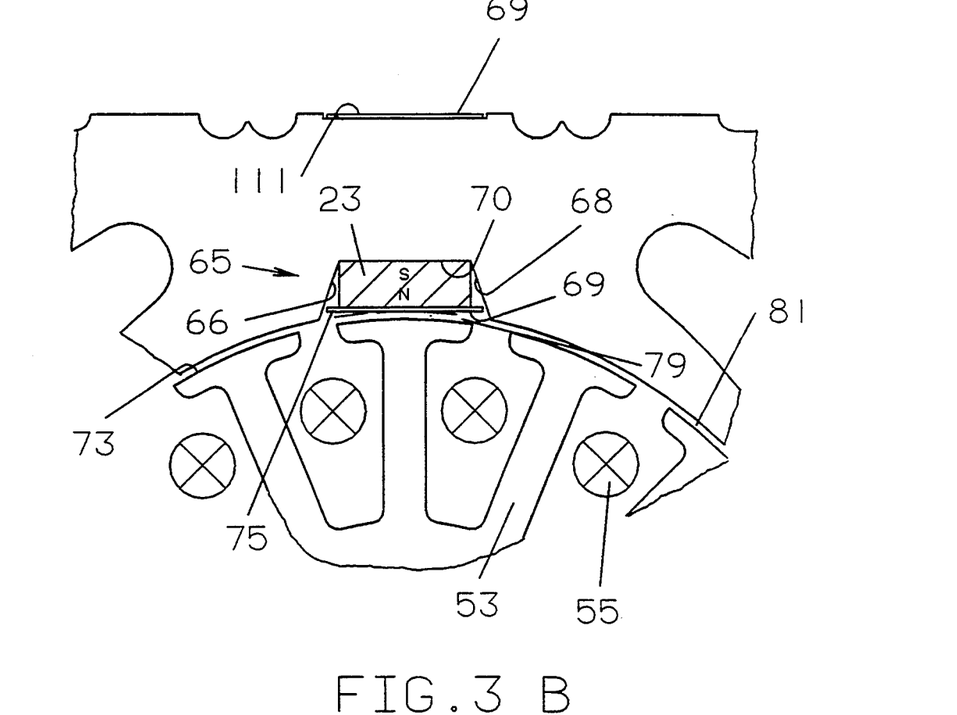
FIG. 3A is a transverse cross-sectional view of the motor of FIG. 1. The cross-sectional view is taken along line 3A—3A of FIG. 5.
FIG. 3B is an enlargement of section 3B of FIG. 3A.
Figure 3A:
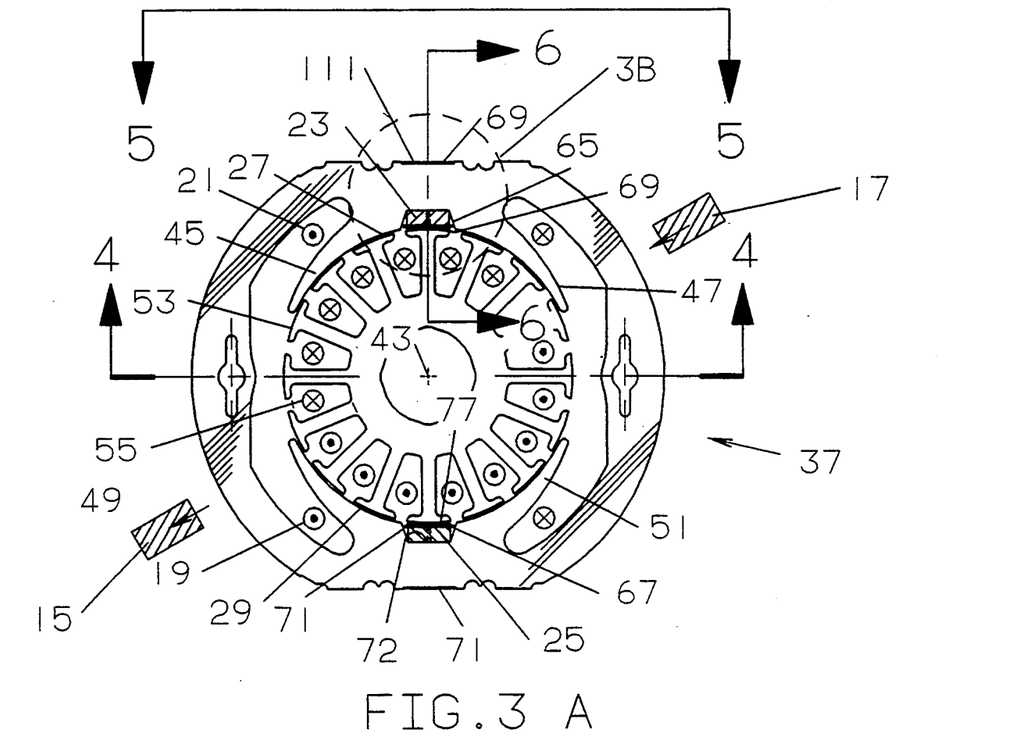
Figure 4:
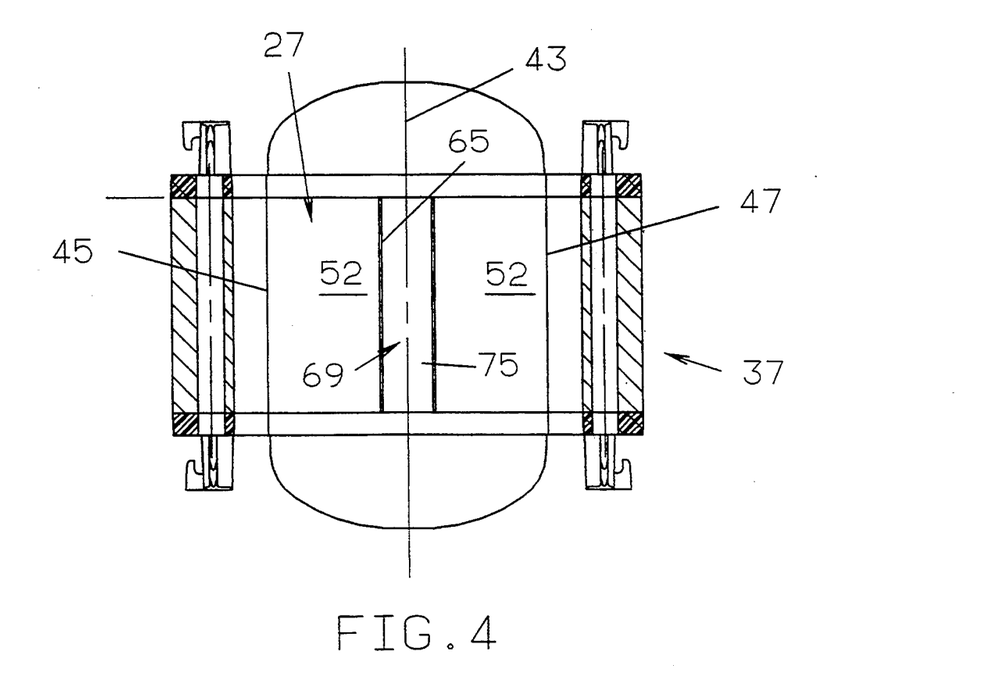
FIG. 4 is an axial cross-sectional view taken along line 4—4 of FIG. 3A and omitting the armature for clarity.
Figure 5:
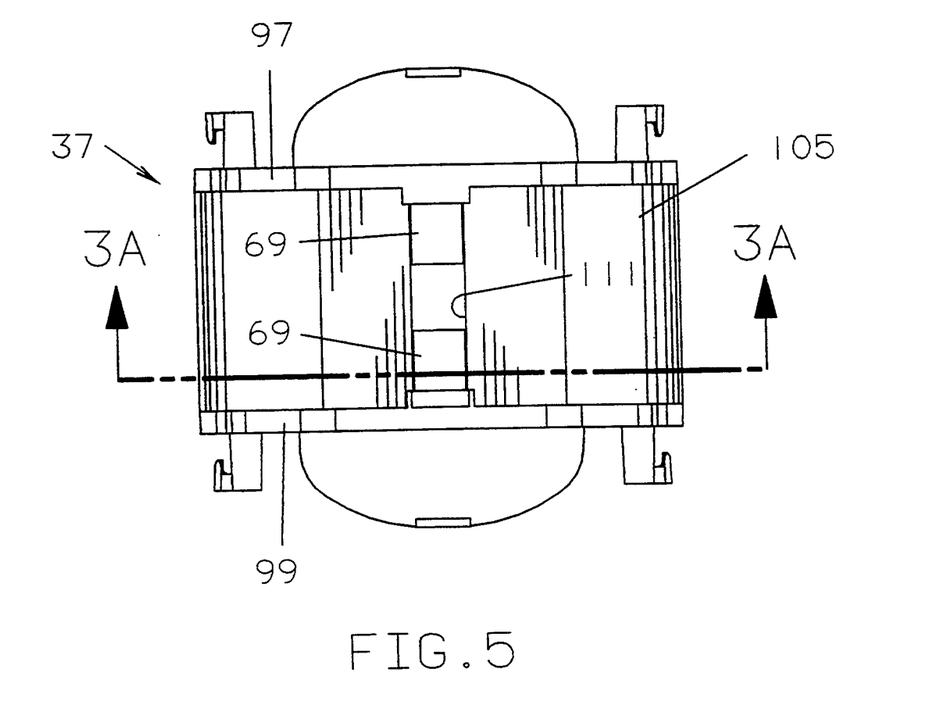
FIG. 5 is a side elevational view of the motor of FIG. 1. The view is taken along line 5—5 of FIG. 3A.
Figure 6:
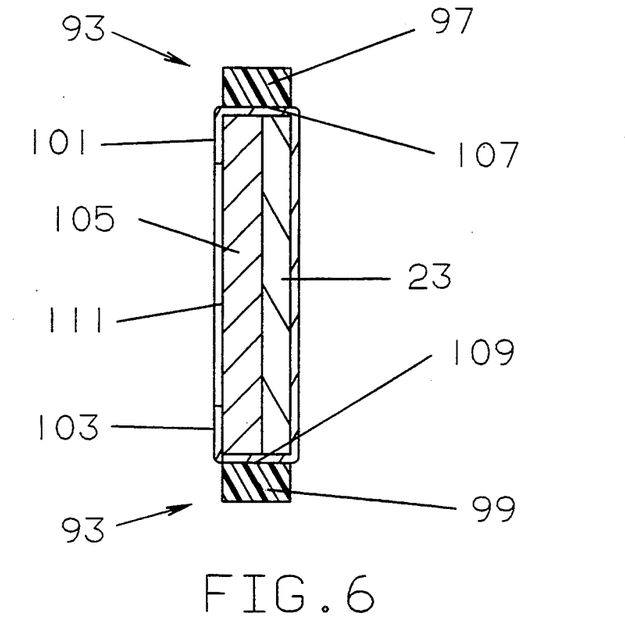
FIG. 6 is a cross-sectional view taken along line 6—6 of FIG. 3A.

In accordance with the present invention, as shown in FIGS. 3A, 3B, to retain magnet 23, 25 in slots 65, 67, first and second straps 69, 71 extend, respectively, along slots 65, 67 and around magnets 23, 25. To optimize brake performance, the size of an air gap 79 (FIG. 3B) that is formed between a segmented cylindrical outer rotor surface 73 and planar inner surfaces 75, 77 of straps 69, 71 must be minimized. To minimize air gap 79 preferably strap surfaces 75, 77 are spaced from rotor surface 73 by a minimum air gap approximately equal to an air gap 81 formed between a pole surface 52 and rotor surface 73. This is achieved by forming and locating each strap 69, 71 such that transverse lines lying in the plane of each strap inner surfaces 73, 75 are approximately tangent to the cylinder defined by the pole inner surfaces 52 thereby permitting air gap 79 to be approximately equal to air gap 81. In other words, the plane of strap surfaces 75, 77 must be substantially planar and uniformly spaced from rotor surface 73 to achieve a minimum air gap 79. Also, straps 69, 71 must maintain magnets 23, 25 in rigid flush engagement with rear slot faces 70, 72. As will be recognized, axial uniformity of gap 79 will enable magnets 23, 25 to be located close to rotor 53 without risking rubbing or engagement between straps 69, 71 and rotor 53. Engagement of straps 69, 71 with rotor 53 will, of course, degrade motor performance through the generation of excessive heat, noise and vibration.

Preferably as shown in FIG. 3B, the width of strap 69 is approximately equal to the width of slot 65 thereby substantially fully enclosing magnet 23 within slot 65. As will be appreciated if the magnet is broken, for example, by a strong shock, the fragments are entrapped within the slot. And, further damage to the motor is avoided.

Figure 7:
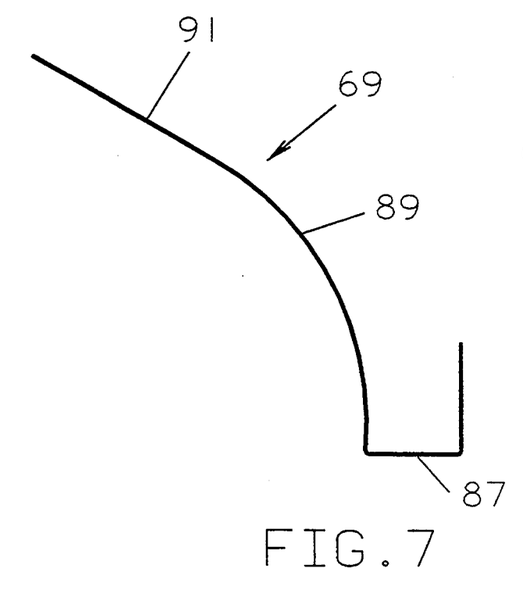
FIG. 7 is a side elevational view of a strap used in the motor shown in FIG. 3A.
Figure 8:
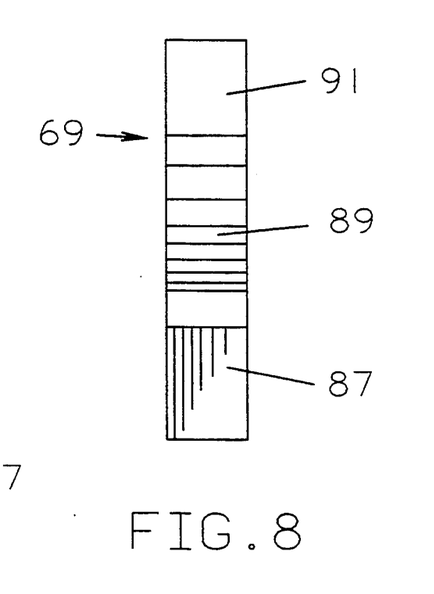
FIG. 8 is a rear elevational view of the strap taken along lines 8—8 of FIG. 7.

As shown in FIGS. 7, 8, to aid in forming surfaces 75, 77 in a substantially uniform plane, each strap 69, 71 is preferably crowned axially of the stator and toward the magnets 23, 25 in the underlying slots 65, 67. Each strap 69, 71 is identical and for convenience only one strap 69 is shown and described. Strap 69 comprises a preformed hooked shaped end 87 for locating over one end of stator 37, a crowned portion 89 and a linear end 91 for bending in place over the opposite end of stator 37. By forming linear end 91 in place over the end of stator 37, strap 69 can be tightly engaged with magnet 23 regardless of dimensional variation in the axial height of stator 37.

During normal operation of motor 11, stator winding temperatures of up to 65° may be encountered. And, in a thermal run away malfunction, stator winding temperatures of up to 250° C. may be encountered. Accordingly, to maintain the stability and durability, strap 69, 71 are preferably made of a nonferrous, low thermal expansion, high spring rate, formable material. One suitable example is a phosphor bronze material, alloy number C51000, half hard temper, and thickness 0.254 millimeters.

In accordance with the present invention, motor 11 further comprises a first and second means 93, 95 for retaining, respectively, first and second straps 69, 71 in tight engagement with first and second magnets 23, 25. First retaining means 93 and second retaining means 95 are preferably identical and for convenience only retaining means 93 is shown and described in detail herein. Preferably as disclosed herein, each retaining means 93 can be constituted by a variety of mechanisms. One retaining means 93 is illustrated in FIGS. 3-6. Three alternative retaining means 96, 98, 100 are illustrated in FIGS. 9-11, respectively. In FIGS. 3-6, retaining means 93 is constituted by first and second stator end rings 97, 99 which are fixed to axially opposed ends of lamination stack 105. (In FIG. 6, for simplicity, rings 97, 99 are illustrated without armature winding shrouds and terminal connectors.) Each strap end 101, 103 extends between and is mechanically fixed or clamped between lamination stack 105 and adjacent end rings 97, 99. To accommodate strap ends 101, 103, each end ring 97, 99 is formed with a narrow channel 107, 109 for receiving the strap end. Lamination stack outer wall 41 may also have a channel 111 for receiving strap end 101, 103.

In FIG. 9, retaining means 96 is constituted by a strap 113 identical to the strap 69 except that first and second strap ends 115, 117 are fixed to axially opposed ends of stack 105 by spot welded joints 119, 121.

In FIG. 10, retaining means 98 is constituted by a strap 123 identical to strap 69 except that strap ends 125, 127 are folded over on the outer wall 41 of stator 37 and are engaged and held by a rib 129 of a motor housing 130.

In FIG. 11, retaining means 100 comprises a strap 131 identical to strap 69 except that strap 131 has first and second ends 133,135 overlapped on outer wall 41 of stator 37 and connected by a welded joint 137.

As will be appreciated by those skilled in the art, the present invention provides a number of advantages. First, magnets 23, 25 are completely trapped by straps 69, 71 and stator 37 to reduce the likelihood that fragments of the magnets may break loose and damage the motor. Secondly, although the minimum air gap between the magnets 23, 25 and rotor 53 is increased by the thickness of straps 69, 71, a small air gap 79 can be achieved. And, at the same time, even though exposed to adverse operating conditions, a stable and durable mounting for brake magnets 23, 25 is achieved. Thirdly, by preforming strap end 87 and forming strap end 91 in place over stack 105, the variation in stack height may be accommodated. And, as a result, straps 69, 71 are positioned in tight, flush engagement with magnets 23, 25. Fourthly, by preforming straps 69, 71 with a crowned portion 89 causes the strap to apply a constant force to magnets 23, 25 and ensures that the straps 69, 71 lay flat on magnets 23, 25. As a result, air gap 79 can be reduced to a minimum because of the low dimensional tolerance of the air gap. Fifthly, straps 69, 71 and the various retaining means 93, 96, 98, 100 enable magnets 23, 25 to be stably located in stator poles 27, 29 with a minimum air gap 79 and limited removal of material from lamination stack 105. Removal of material from lamination stack 105 (and particularly from poles 27, 29) degrades motor performance by suppressing the generation of the stator magnetic field.

It will be apparent to those skilled in the art that various modifications and variations can be made in the present invention without departing from the spirit and scope of the invention. Thus, it is intended that the present invention cover these modifications and variations provided they come within the scope of the appended claims and their equivalents.

I claim:
1. A motor comprising:
a housing;
a stator having inner and outer walls;
the stator comprising first and second opposed poles
(a) formed on opposed locations of the inner wall,
(b) having cylindrical inner surfaces defining a longitudinal axis, and (c) extending axially of the inner wall;
the stator comprising first and second stator windings wound, respectively, around the first and second poles;
an armature rotatably supported in the housing and extending along and rotatable about the longitudinal axis of the stator;
the armature comprising a rotor and an armature winding wound on the rotor;
a switch having a first position for supplying power to the stator and armature windings for operation of the motor and having a second position for short circuiting the armature windings;
a first and second opposed, axially extending slots formed in the first and second poles;
first and second permanent magnets located respectively in the first and second slots;
first and second straps, respectively, extending along the first and second slots, extending around and retaining the first and second magnets in the first and second slots and having a width approximately equal to the width of first and second slots to thereby substantially fully enclose the first and second magnets within the first and second slots; and first and second means for retaining, respectively, the first and second straps in tight engagement with the first and second magnets.

2. The motor of claim 1 wherein the retaining means comprises each strap having first and second ends overlapped on the outer wall of the stator and the housing engaging and holding the overlapped ends against the outer wall.

3. The motor of claim 1 wherein each strap having first and second ends fixed to the axially opposed ends of the stator by welding.

4. The motor of claim 1 wherein the retaining means comprises first and second end rings; and the first and second strap ends are fixed to the axially opposed ends of the stator by the first and second end rings, respectively.

5. The motor of claim 1 wherein the retaining means comprises each strap having first and second ends overlapped on the outer wall of the stator and connected by a welded joint.

6. The motor of claim 1 wherein each strap is crowned axially of the stator and toward the magnet in the underlying slot.

7. The motor of claim 1 wherein:

the rotor has a segmented cylindrical outer surface spaced from the inner surfaces of the poles;

a first air gap is defined between the pole inner surfaces and the rotor outer surface;

each strap has a planar inner face;

a transverse line lying in the plane of one strap inner face is approximately tangent to the cylinder defined by the inner surfaces of the poles and defines with the rotor outer surface a second air gap approximately equal to the first air gap.

8. A motor comprising:

a housing;

a stator having inner and outer walls;

the stator comprising first and second opposed poles
  (a) formed on opposed locations of the inner wall,
  (b) having cylindrical inner surfaces defining a longitudinal axis, and (c) extending axially of the inner wall;

the stator comprising first and second stator windings wound, respectively, around the first and second poles;

an armature rotatably supported in the housing and extending along and rotatable about the longitudinal axis of the stator;

the armature comprising a rotor and an armature winding wound on the rotor;

a switch having a first position for supplying power to the stator and armature windings for operation of the motor and having a second position for short circuiting the armature windings;

an axially extending slot formed in the first pole;

a permanent magnet located in the slot;

a strap extending along the slot, extending around and retaining the magnet in the slot and having a width approximately equal to the width of the slot to thereby substantially fully enclose the magnet within the slot; and a means for retaining the strap in tight engagement with the magnet.

9. The motor of claim 8 wherein:

the retaining means comprises the strap having first and second ends overlapped on the outer wall of the stator and the housing engaging and holding the overlapped ends against the outer wall.

10. The motor of claim 8 wherein the first and second strap ends are fixed to the axially opposed ends of the stator by welding.

11. The motor of claim 8 wherein:

the retaining means comprises first and second end rings; and the first and second strap ends are fixed to the axially opposed ends of the stator by the first and second end rings, respectively.

12. The motor of claim 8 wherein the retaining means comprises the strap having first and second ends overlapped on the outer wall of the stator and connected by a welded joint.

13. The motor of claim 8 wherein the strap is crowned axially of the stator and toward the magnet in the underlying slot.

14. The motor of claim 8 wherein:

the rotor has a segmented cylindrical outer surface spaced from the pole inner surfaces;

a first air gap is defined between the inner surfaces of the poles and the rotor outer surface;

the strap has a planar inner face; and a transverse line lying in the plane of the strap inner face is approximately tangent to the cylinder defined by the inner surfaces of the poles and defines with the rotor outer surface a second air gap approximately equal to the first air gap.

15. A motor comprising:

a housing;

a stator having inner and outer walls;

the stator comprising first and second opposed poles
  (a) formed on opposed locations of the inner wall,
  (b) having cylindrical inner surfaces defining a longitudinal axis, and (c) extending axially of the inner wall;

the stator comprising first and second stator windings wound, respectively, around the first and second poles;

an armature rotatably supported in the housing and extending along and rotatable about the longitudinal axis of the stator;

the armature comprising a rotor and an armature winding wound on the rotor;

a switch having a first position for supplying power to the stator and armature windings for operation of the motor and having a second position for short circuiting the armature windings;

a first and second opposed, axially extending slots formed in the first and second poles;

first and second permanent magnets located respectively in the first and second slots;

first and second straps, respectively, extending along the first and second slots and extending around and retaining the first and second magnets in the first and second slots;

first and second means for retaining, respectively, the first and second straps in tight engagement with the first and second magnets; and the retaining means comprising each strap having first and second ends overlapped on the outer wall of the stator and the housing engaging and holding the overlapped ends against the outer wall.

16. A motor comprising:
a housing;
a stator having inner and outer walls;
the stator comprising first and second opposed poles (a) formed on opposed locations of the inner wall, (b) having cylindrical inner surfaces defining a longitudinal axis, and (c) extending axially of the inner wall;
the stator comprising first and second stator windings wound, respectively, around the first and second poles;
an armature rotatably supported in the housing and extending along and rotatable about the longitudinal axis of the stator;
the armature comprising a rotor and an armature winding wound on the rotor;
a switch having a first position for supplying power to the stator and armature windings for operation of the motor and having a second position for short circuiting the armature windings;
a first and second opposed, axially extending slots formed in the first and second poles;
first and second permanent magnets located respectively in the first and second slots;
first and second straps, respectively, extending along the first and second slots and extending around and retaining the first and second magnets in the first and second slots;
first and second means for retaining, respectively, the first and second straps in tight engagement with the first and second magnets; and
the retaining means comprising each strap having first and second ends overlapped on the outer wall of the stator and connected by a welded joint.

17. A motor comprising:
a housing;
a stator having inner and outer walls;
the stator comprising first and second opposed poles (a) formed on opposed locations of the inner wall, (b) having cylindrical inner surfaces defining a longitudinal axis, and (c) extending axially of the inner wall;
the stator comprising first and second stator windings wound, respectively, around the first and second poles;
an armature rotatably supported in the housing and extending along and rotatable about the longitudinal axis of the stator;
the armature comprising a rotor and an armature winding wound on the rotor;
a switch having a first position for supplying power to the stator and armature windings for operation of the motor and having a second position for short circuiting the armature windings;
a first and second opposed, axially extending slots formed in the first and second poles;
first and second permanent magnets located respectively in the first and second slots;
first and second straps, respectively, extending along the first and second slots and extending around and retaining the first and second magnets in the first and second slots;
each strap crowned axially of the stator and toward the magnet in the underlying slot; and
first and second means for retaining, respectively, the first and second straps in tight engagement with the first and second magnets.

18. A motor comprising:
a housing;
a stator having inner and outer walls;
the stator comprising first and second opposed poles (a) formed on opposed locations of the inner wall, (b) having cylindrical inner surfaces defining a longitudinal axis, and (c) extending axially of the inner wall;
the stator comprising first and second stator windings wound, respectively, around the first and second poles;
an armature rotatably supported in the housing and extending along and rotatable about the longitudinal axis of the stator;
the armature comprising (a) a rotor having a segmented cylindrical outer surface spaced from the inner surfaces of the poles and (b) an armature winding wound on the rotor;
a first air gap defined between the inner surfaces of the poles and the rotor outer surface;
a switch having a first position for supplying power to the stator and armature windings for operation of the motor and having a second position for short circuiting the armature windings;
a first and second opposed, axially extending slots formed in the first and second poles;
first and second permanent magnets located respectively in the first and second slots;
first and second straps, respectively, extending along the first and second slots and extending around and retaining the first and second magnets in the first and second slots;
each strap having a planar inner face;
a transverse line lying in the plane of one strap inner face being approximately tangent to the cylinder defined by the inner surfaces of the poles and defining with the rotor outer surface a second air gap approximately equal to the first air gap; and
first and second means for retaining, respectively, the first and second straps in tight engagement with the first and second magnets.

19. A motor comprising:
a housing;
an stator having inner and outer walls;
the stator comprising first and second opposed poles (a) formed on opposed locations of the inner wall, (b) having cylindrical inner surfaces defining a longitudinal axis, and (c) extending axially of the inner wall;
the stator comprising first and second stator windings wound, respectively, around the first and second poles;
an armature rotatably supported in the housing and extending along and rotatable about the longitudinal axis of the stator;
the armature comprising a rotor and an armature winding wound on the rotor;
a switch having a first position for supplying power to the stator and armature windings for operation of the motor and having a second position for short circuiting the armature windings;
an axially extending slot formed in the first pole;
a permanent magnet located in the slot;
a strap extending along the slot and extending around and retaining the magnet in the slot;

a means for retaining the strap in tight engagement with the magnet; and the retaining means comprising the strap having first and second ends overlapped on the outer wall of the stator and the housing engaging and holding the overlapped ends against the outer wall.

20. A motor comprising:

a housing;

an stator having inner and outer walls;

the stator comprising first and second opposed poles (a) formed on opposed locations of the inner wall, (b) having cylindrical inner surfaces defining a longitudinal axis, and (c) extending axially of the inner wall;

the stator comprising first and second stator windings wound, respectively, around the first and second poles;

an armature rotatably supported in the housing and extending along and rotatable about the longitudinal axis of the stator;

the armature comprising a rotor and an armature winding wound on the rotor;

a switch having a first position for supplying power to the stator and armature windings for operation of the motor and having a second position for short circuiting the armature windings;

an axially extending slot formed in the first pole;

a permanent magnet located in the slot;

a strap extending along the slot and extending around and retaining the magnet in the slot;

a means for retaining the strap in tight engagement with the magnet; and the retaining means comprising the strap having first and second ends overlapped on the outer wall of the stator and connected by a welded joint.

21. A motor comprising:

a housing;

an stator having inner and outer walls;

the stator comprising first and second opposed poles (a) formed on opposed locations of the inner wall, (b) having cylindrical inner surfaces defining a longitudinal axis, and (c) extending axially of the inner wall;

the stator comprising first and second stator windings wound, respectively, around the first and second poles;

an armature rotatably supported in the housing and extending along and rotatable about the longitudinal axis of the stator;

the armature comprising a rotor and an armature winding wound on the rotor;

a switch having a first position for supplying power to the stator and armature windings for operation of the motor and having a second position for short circuiting the armature windings;

an axially extending slot formed in the first pole;

a permanent magnet located in the slot;

a strap extending along the slot and extending around and retaining the magnet in the slot;

the strap crowned axially of the stator and toward the magnet in the underlying slot; and a means for retaining the strap in tight engagement with the magnet.

22. A motor comprising:

a housing;

a stator having inner and outer walls;

the stator comprising first and second opposed poles (a) formed on opposed locations of the inner wall, (b) having cylindrical inner surfaces defining a longitudinal axis, and (c) extending axially of the inner wall;

the stator comprising first and second stator windings wound, respectively, around the first and second poles;

an armature rotatably supported in the housing and extending along and rotatable about the longitudinal axis of the stator;

the armature comprising (a) a rotor having a segmented cylindrical outer surface spaced from the inner surfaces of the poles and (b) an armature winding wound on the rotor;

a first air gap defined between the inner surfaces of the poles and the rotor outer surface;

a switch having a first position for supplying power to the stator and armature windings for operation of the motor and having a second position for short circuiting the armature windings;

an axially extending slot formed in the first pole;

a permanent magnet located in the slot;

a strap extending along the slot and extending around and retaining the magnet in the slot;

the strap having a planar inner face;

a transverse line lying in the plane of the strap inner face being approximately tangent to the cylinder defined by the inner surfaces of the poles and defining with the rotor outer surface a second air gap approximately equal to the first air gap; and a means for retaining the strap in tight engagement with the magnet.

* * * * *